(12) United States Patent  (10) Patent No.: US 8,972,316 B2
Nugent  (45) Date of Patent: Mar. 3, 2015

(54) EXTENSIBLE ADAPTIVE CLASSIFICATION FRAMEWORK

(75) Inventor: Alex Nugent, Santa Fe, NM (US)

(73) Assignee: KnowmTech, LLC, Albuquerque, NM (US)

( * ) Notice: Subject to any disclaimer, the term of this patent is extended or adjusted under 35 U.S.C. 154(b) by 278 days.

(21) Appl. No.: 13/616,811

(22) Filed: Sep. 14, 2012

(65) Prior Publication Data

US 2014/0006323 A1   Jan. 2, 2014

Related U.S. Application Data

(60) Provisional application No. 61/665,415, filed on Jun. 28, 2012.

(51) Int. Cl.
| | |
|---|---|
| G06F 15/18 | (2006.01) |
| G06N 3/08 | (2006.01) |
| G06E 1/00 | (2006.01) |
| G06E 3/00 | (2006.01) |
| G06G 7/00 | (2006.01) |

(52) U.S. Cl.
USPC ............................................. 706/26; 706/25

(58) Field of Classification Search
None
See application file for complete search history.

(56) References Cited

U.S. PATENT DOCUMENTS

| | | | |
|---|---|---|---|
| 5,794,224 A | 8/1998 | Yufik | |
| 6,889,216 B2 | 5/2005 | Nugent | |
| 6,995,649 B2 | 2/2006 | Nugent | |
| 7,028,017 B2 | 4/2006 | Nugent | |
| 7,039,619 B2 | 5/2006 | Nugent | |
| 7,107,252 B2 | 9/2006 | Nugent | |
| 7,392,230 B2 | 6/2008 | Nugent | |
| 7,398,259 B2 | 7/2008 | Nugent | |
| 7,409,375 B2 | 8/2008 | Nugent | |
| 7,412,428 B2 | 8/2008 | Nugent | |
| 7,420,396 B2 | 9/2008 | Nugent | |
| 7,426,501 B2 | 9/2008 | Nugent | |
| 7,502,769 B2 | 3/2009 | Nugent | |
| 7,599,895 B2 | 10/2009 | Nugent | |
| 7,752,151 B2 | 7/2010 | Nugent | |
| 7,827,130 B2 | 11/2010 | Nugent | |
| 7,827,131 B2 | 11/2010 | Nugent | |
| 7,930,257 B2 | 4/2011 | Nugent | |
| 8,022,732 B2 | 9/2011 | Nugent | |
| 8,041,653 B2 | 10/2011 | Nugent | |
| 8,051,021 B2 | 11/2011 | Aggarwal et al. | |
| 8,140,584 B2 | 3/2012 | Guha | |
| 8,165,979 B2 | 4/2012 | Aggarwal et al. | |

(Continued)

OTHER PUBLICATIONS

Rowley, Henry A., Shumeet Baluja, and Takeo Kanade. "Neural network-based face detection." Pattern Analysis and Machine Intelligence, IEEE Transactions on 20.1 (1998): 23-38.*

(Continued)

*Primary Examiner* — Kakali Chaki
*Assistant Examiner* — Daniel Pellett
(74) *Attorney, Agent, or Firm* — Kermit D. Lopez; Luis M. Ortiz; Ortiz & Lopez, PLLC (57) ABSTRACT

An extensible adaptive classification framework and method can include multiple feature detection modules, and a platform for integrating the multiple feature detection modules utilizing a plurality of AHaH nodes as adaptive classifiers over a feature space of multiple and extensible feature factory modules, thereby configuring the platform as an extensible and continuously adaptive pattern recognition platform.

20 Claims, 2 Drawing Sheets

(56) References Cited

U.S. PATENT DOCUMENTS

2004/0162796 A1* 8/2004 Nugent .......................... 706/27
2011/0145179 A1 6/2011 Nugent
2013/0073493 A1* 3/2013 Modha .......................... 706/25

OTHER PUBLICATIONS

Nguyen, Minh Q., Peter M. Atkinson, and Hugh G. Lewis. "Super-resolution mapping using a Hopfield neural network with LIDAR data." Geoscience and Remote Sensing Letters, IEEE 2.3 (2005): 366-370.*

Nugent, Alex. EP 1 483 737 B1 (2011).*

Nugent, M. A., R. Porter, and G. T. Kenyon. "Reliable computing with unreliable components: Using separable environments to stabilize long-term information storage." Physica D: Nonlinear Phenomena 237.9 (2008): 1196-1206.*

Nugent, Alex, Garrett Kenyon, and Reid B. Porter. "Unsupervised Adaptation to Improve Fault Tolerance of Neural Network Classifiers." Evolvable Hardware. 2004.*

Yufik, Y. M., "Virtual Associative Networks: A Framework for Cognitive Modeling." Brian and Values: Is a Biological Science of Values Possible (1998) Lawrence Erlbaum Associates, Inc., Pribram, K. H. (ed.), Mahway, NJ, pp. 109-177.

Yufik, Y. M. et al., "Swiss Army Knife and Ockham's Razor: Modeling and Facilitating Operator's Comprehension in Complex Dynamic Tasks," IEEE Transactions on Systems, Man, and Cybernetics—Part A: Systems and Humans (2002) 32(2):185-199.

Yufik, Y. M., "How the Mind Works: An Exercise in Pragmatism," Inst. of Med. Cybern. Inc. (2002) Gaithersburg, MD, 5 pages.

* cited by examiner

EXTENSIBLE ADAPTIVE CLASSIFICATION FRAMEWORK

CROSS-REFERENCE TO PROVISIONAL APPLICATION

This application clams priority under 35 U.S.C. 119(e) to U.S. Provisional Patent Application Ser. No. 61/665,415, entitled "Extensible Adaptive Classification Framework," which was filed on Jun. 28, 2012 the disclosure of which is incorporated herein by reference in its entirety.

TECHNICAL FIELD

Embodiments are generally related to the classification methods and systems. Embodiments additionally relate to computer system and network intrusion detection applications. Embodiments further relate to synaptic plasticity rules, such as the AHaH (Anti-Hebbian and Hebbian) Plasticity Rule.

BACKGROUND

Currently deployed network intrusion prevention systems, such as, for example, Snort, detect intrusions and malicious activity by matching real-time network packets against a library of intrusion signatures or patterns based on known attack vectors. These patterns can be defined only after an intrusion occurs and has been identified. Writing and applying arbitrary rules leads to the major problems of either being too general (e.g., false positives) or too specific (e.g., false negatives), leaving analysts frustrated and not effectively preventing intrusions and malicious activity. If the analysts want the false alarms to stop, they either need to make the rule more specific or deactivating it. Deactivating a rule is obviously not good and gives the attacker an advantage. Making the rule more specific is also not ideal, as it makes the rule fragile and more likely to be circumvented by trivial changes, also giving the attacker the advantage. Put simply, the properties of intelligence and adaptability are contained entirely within the human users.

Many attempts have been made over the years to design automated machine-learning algorithms to detect intrusions and attacks. Such systems fall into two general categories: misuse based and anomaly based. There is clearly no "silver bullet" algorithm. Rather, some attacks are easier to detect than others, some algorithms excel in some situations and fail in others. These algorithms do not find there way into production systems even though they possess utility because no algorithm solves the whole problem. Integration of each algorithm into a scalable and extensible platform that supports real-world production capabilities rather then academic proof-of-concept is an extremely non-trivial task.

BRIEF SUMMARY

The following summary of the invention is provided to facilitate an understanding of some of the innovative features unique to the disclosed embodiments, and is not intended to be a full description. A full appreciation of the various aspects of the invention can be gained by taking the entire specification, claims, drawings, and abstract as a whole.

It is, therefore, one aspect of the disclosed embodiments to provide for an extensible adaptive classification framework.

It is another aspect of the disclosed embodiments to provide for a framework for the integration of multiple feature detection algorithms utilizing AHaH nodes as adaptive classifiers over the feature space of multiple and extensible feature factory modules.

It is a further aspect of the disclosed embodiments to create an extensible and continuously adaptive pattern recognition platform.

It is also an aspect of the disclosed embodiments to provide for an extensible adaptive classification framework which can be applied to network intrusion detection, speech recognition, image recognition, internet page content recognition, email spam filters, financial market forecasting, geospatial and spatio-temporal environmental data analysis, text classification, protein structure prediction, LIDAR, 3D based object classification, etc.

The aforementioned aspects and other objectives and advantages can now be achieved as described herein. An extensible adaptive classification framework can be implemented, which includes, for example, multiple feature detection modules, and a platform for integrating the multiple feature detection modules utilizing a plurality of AHaH nodes as adaptive classifiers over a feature space of multiple and extensible feature factory modules, thereby configuring the platform as an extensible and continuously adaptive pattern recognition platform. In another embodiment, each feature detection module among the multiple feature detection modules can be an algorithm.

In another embodiment, such a platform can be utilized for network intrusion detection. In another embodiment, such a platform can be utilized for speech recognition. In yet another embodiment, such a platform can be utilized for image recognition. In still another embodiment, such a platform can be utilized for Internet page content recognition. In other embodiments, such a platform can be utilized for financial market forecasting. In still other embodiments, such a platform can be utilized for geospatial and spatio-temporal environmental data analysis. In yet other embodiments, such a platform can be utilized for text classification. In another embodiment, such a platform can be utilized for protein structure prediction. In still other embodiments, such a platform can be utilized for LIDAR classification. In yet other embodiments, such a platform can be utilized for 3D based object classification. Finally, such a platform can be used to integrate multiple data sources such as those listed above so as to provide an extensible sensor-fusion system. Additionally, in another embodiment, a sum over at least one weight connecting at least one feature factory to at least one AHaH node among the plurality of AHaH nodes can be utilized as measure of at least one feature factory value.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate an embodiment of the present invention and are not intended to limit the scope of the invention.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Note that the term "module" as utilized herein may refer to a physical module or component such as electrical component/hardware and/or the term "module" may refer to computer software (e.g., a software module, program module, etc), computer programs, subroutines, routines, etc. Generally, program modules include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, handheld devices, multi-processor systems, data networks, microprocessor-based or programmable consumer electronics, networked personal computers, minicomputers, mainframe computers, servers, and the like.

The term "module" as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as text classification, image recognition, speech recognition, financial market forecasting, etc.

It can be appreciated the disclosed framework may be implemented in the context of hardware (e.g., as an IC chip) and/or as computer software, module, etc., for carrying out instructions/algorithms, etc. Thus, the disclosed framework can be implemented as a hardware IC chip, software modules, etc., or a combination thereof.

The disclosed framework couples continuous adaptation to an extensible modular architecture. Such a framework is capable of bootstrapping itself from state-of-the-art systems and growing to encompass new feature learning strategies without having to be taken off-line. Owning to the use of the AHaH plasticity rule, the disclosed framework learns continuous optimal classification boundaries over the space of continuously evolving features. "AHaH" generally refers to "Anti-Hebbian and Hebbian". Hence, "AHaH plasticity" refers to "Anti-Hebbian and Hebbian plasticity" and an "AHaH Node" refers to a neuron model that implements AHaH plasticity.

One non-limiting example of an application of an AHaH plasticity rule is disclosed in U.S. Pat. No. 7,398,259 entitled "Training of a Physical Neural Network," which is incorporated herein by reference. Another non-limiting example of an AHaH plasticity rule is disclosed in U.S. Pat. No. 7,409,375 entitled "Plasticity-induced Self Organizing Nanotechnology for the Extraction of Independent Components from a Data Stream," which is also incorporated herein by reference. A further non-limiting example of an AHaH plasticity rule is disclosed in U.S. Pat. No. 7,412,428 entitled "Application of Hebbian and Anti-Hebbian Learning to Nanotechnology-Based Physical Neural Networks," which is incorporated herein by reference.

An additional non-limiting example of an AHaH plasticity rule is disclosed in U.S. Pat. No. 7,420,396 entitled "Universal Logical Gate Utilizing Nanotechnology," which is incorporated herein by reference. Another non-limiting example of an AHaH plasticity rule is disclosed in U.S. Pat. No. 7,502,769 entitled "Fractal Memory and Computational Methods and Systems Based on Nanotechnology," which is incorporated herein by reference. A further non-limiting example of an AHaH plasticity rule is disclosed in U.S. Pat. No. 7,599,895 entitled "Methodology for the Configuration and Repair of Unreliable Switching Elements," which is incorporated herein by reference. Another non-limiting example of an AHaH plasticity rule is disclosed in U.S. Pat. No. 7,827,130 entitled "Fractal Memory and Computational Methods and Systems Based on Nanotechnology".

An additional non-limiting example of an AHaH plasticity rule is disclosed in U.S. Pat. No. 7,930,257 entitled "Hierarchical Temporal Memory Utilizing Nanotechnology". A further non-limiting example of an AHaH plasticity rule is disclosed in U.S. Pat. No. 8,022,732 entitled "Universal Logic Gate Utilizing Nanotechnology". Another example of an AHaH plasticity rule is disclosed in U.S. Pat. No. 8,041,653 entitled "Method and System for a Hierarchical Temporal Memory Utilizing a Router Hierarchy and Hebbian and Anti-Hebbian Learning," which is incorporated herein by reference.

In the application space of cyber intrusion detection, rather than iterate through rules looking for a match, the disclosed framework takes activated features and uses them as keys in a highly efficient map and dynamically constructs an output vector consisting of activated AHaH nodes (e.g., nodes which behave or follow an AHaH plasticity rule). The processor load is thus directly proportional to the packet volume and not the number of rules. Unlike modern deployed systems, which buckle under the addition of new rules, the disclosed framework is capable of detecting an almost unlimited number of intrusion types or patterns with little or no degradation in processing performance.

The link-based and associative nature of the disclosed framework enables it to rapidly bring a user's attention to exactly what features it is using to base its decision. By requesting live feedback from a human user, for example, our framework can adapt itself to continuously reduce a false-positive rate.

Current deployed approaches to intrusion detection are fragile and cumbersome in the complex and constantly changing environment that has emerged. The disclosed framework fixes this problem by creating a revolutionary extensible "classification engine" capable of continuous adaptation and integration of feature factories through time, without having to take the system offline or retrain.

A feature factory is any potential algorithm for processing information and producing feature detection events. For example, an image may be input to a feature factory and its output may consist of a sparse activation of feature ID's corresponding to edges, corners or higher level concepts such as eyes, ears, smiles, frowns, faces, etc.

This technique applied to a number of other application areas, for example image recognition, Internet search, bio informatics, assembly line processing and in general any area where pattern classification is performed. Rather than take TCP packet data as input, for example, we could be taking raw text or html markup from a web page, image data, genomic data, pressure/temperature measurements, etc.

Like many machine learning classification system, the disclosed framework is configured from two systems: (1) Feature Extraction and (2) Classification. This, however, is where is the similarity ends. The disclosed framework is capable of continuous unsupervised optimization of classification of decision surfaces via an Anti-AHaH plasticity rule. This capability of continuous adaptation allows for the continual integration and adaption to an evolving "sea of features" generated by a continuously refined and developed set of feature factories. In other words, without ever having to be taken offline or re-trained, our framework is capable of seamlessly integrating new information sources and feature extraction algorithms, optimally allocated sensor resources to best support classification or recognition tasks.

Figure 1:
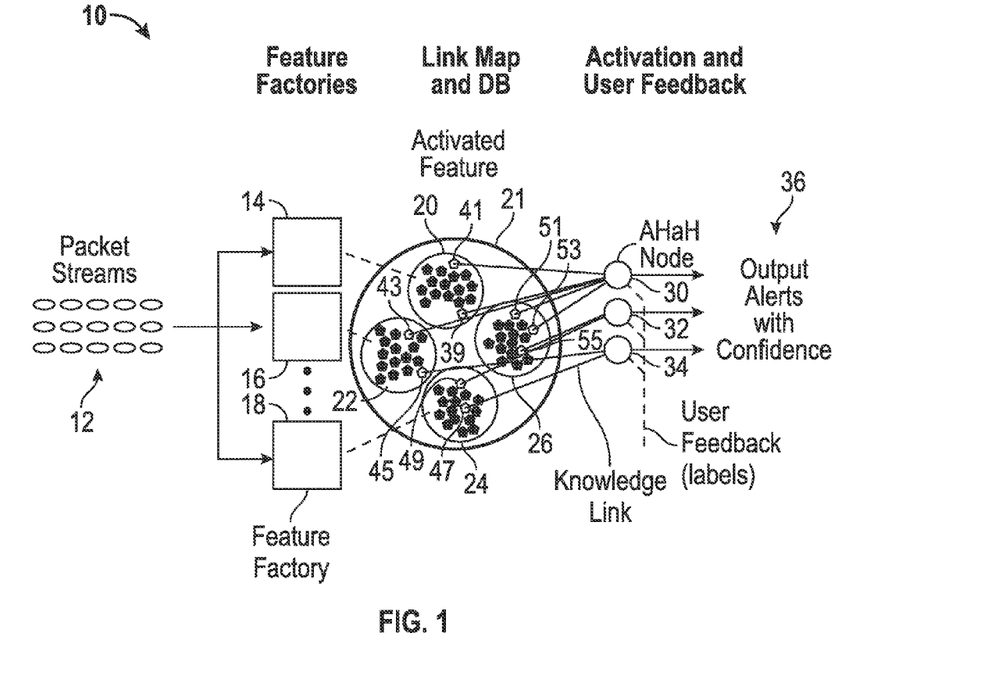
FIG. 1 illustrates an example extensible adaptive classification framework, in accordance with an embodiment.

FIG. 1 illustrates an example extensible adaptive classification framework 10, in accordance with an embodiment. The framework 10 includes one or more feature factor modules 14, 16, 18 which receive network packet data 12 (e.g., packet streams). Thus, presume for the moment that we have implemented a feature factory module (e.g., modules 14, 16, 18, etc) and that the module is receiving/taking network packet data and producing feature activations as shown in circle 21 in FIG. 1. Example feature activations 41, 43, 45, 47, 49, 51, 53 and 55 are shown in FIG. 1. Not that activations 39, 41 are shown in FIG. 1 within circle 20. Activations 43, 45 are shown within circle 22, which represents feature factory 16. Activations 47, 49 are shown within circle 24, which represents feature factory 18. Activations 51, 55 are shown within circle 26, which represents a feature factory not shown. These activations can be employed as a key to creating or accessing previously created knowledge links. Each knowledge link associates a feature within a feature factory with an AHaH node such as, for example, AHaH nodes 30, 32, 34, etc and represents a real-valued, signed, non-number. Each AHaH node operates the AHaH plasticity rule, which can be expressed most simply indicated in equation (1):

$$\Delta w_i = x_i f(y) - \delta w_i \quad (1)$$

$$\Delta w_{bias} = -Yy$$

-continued $$y = \sum_{i=0}^{N} x_i w_i + w_{bias}$$

$$f(y) = -\alpha y + \beta \operatorname{sign}(y)$$

In equation (1) above of the AHaH plastic rule, the expression $x_i \in [0,1]$ represents the $i^{th}$ input, $w_i$ the $i^{th}$ weight and $\alpha$, $\beta$, $\gamma$ and $\delta$ constants. We emphasize that although in this case the input is restricted to binary values, it may in general be continues values. There are, however, advantages to binary "sparse" representations most notably high scalability. For this reason, out disclosure emphasis the sparse binary representation. The variable $\delta$ May be interpreted as a decay factor. Note that the function $f(y)$ may be modified to achieve the key properties that a transition between Hebbian and Anti-Hebbian learning occurs as the post-synaptic potential y is increased in magnitude. The activation of the $i^{th}$ feature is thus represented as $x_i = 1$. Feature activations are presumed to be (but need not be) sparse. For example, out of 100,000 possible inputs, perhaps 5,000 inputs or less are active.

An AHaH node is trying to find a way to partition its input space as cleanly as possible. The attractor points of the AHaH plasticity rule nodes are optimal linear classifiers. The AHaH rule affords continual and efficient adaptation via continual maximization of decision margins. Due to the Hebbian→Anti-Hebbian transition, the plasticity rule performs an auto-normalization of weights. The combined property of support vector maximization and auto normalization allows for a direct measure of the value of the link in supporting the nodes classification/discrimination task at that time. More specifically, the value v of the $i^{th}$ feature factory in supporting the $j^{th}$ label is the sum over the magnitude of all weights connecting features produced by the $i^{th}$ feature factory to the $i^{th}$ label. In this context a label is an AHaH node.

It is therefore possible to decouple the front-end feature extraction algorithms from the back-end classification system, the result being an extensible and continuously adaptive learning platform where both the feature extraction modules and the classification boundaries can self-optimize over time.

Knowledge links with very small magnitude weights are useless and can be discarded, as it is a reflection that the feature is not useful in maintaining an optimal classification. Since the space of features are essentially limitless and the volume of input data extraordinary, it is exceptionally important to be able to rapidly stabilize useful features from continuously generated new features and discard useless features. This is also generally understood as the problem of sensor allocation. Given a very large space of potential data streams and limited set of sensors, the problem becomes one of optimally allocating the sensors across the data space so as to optimally support a recognition task, avoiding for example redundant allocations of sensor resources.

Let us illustrate this with an example, where our framework is used for a Network Adaptive Intrusion Detection application (NetAID). In general, intrusion detection is the process of monitoring the events occurring in a computer system or network, analyzing such events for signs of intrusions typically defined as attempts to compromise the confidentiality, integrity, availability, and/or to bypass the security mechanisms of a computer or network. Vast quantities of data exist, and there are limited computational resources available to process such data looking for features. It is therefore useful for such systems to be able to self-optimize to maximally utilize their resources in support of multiple unique tasks.

Figure 2:
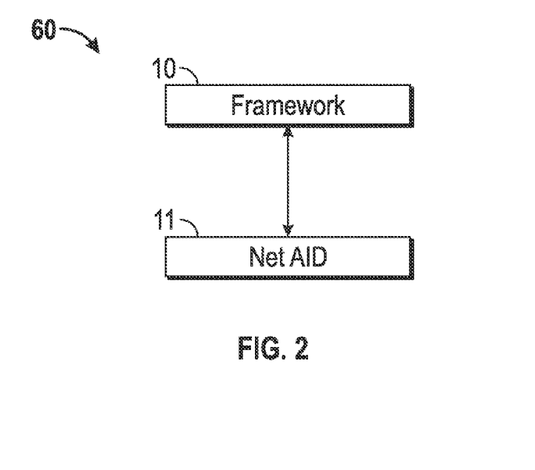
FIG. 2 illustrates a block diagram of a system that includes the framework adapted for use with a NetAID (Network Adaptive Intrusion Detection) application, in accordance with an alternative embodiment.

FIG. 2 illustrates a block diagram of a system 60 that includes the framework 10 adapted for use with a NetAID (Network Adaptive Intrusion Detection) Application 11, in accordance with an alternative embodiment. In one scenario, user Joe Admin initializes NetAID 11 by enabling the "rule feature factory", a module that converts existing packet signatures or rules into feature activations (i.e., see framework 10). Joe also initializes a packet fragmentation feature factory, which continuously optimizes itself to generate strings based on packet fragments. Joe runs NetAID 11 and instructs it to assign each rule activation to a specific AHaH node-training signal indicating attack types or classes. Joe then exposes NetAID 11 to live packet data (e.g., packet streams 12 depicted in FIG. 1).

With no further interaction, NetAID 11 is now teaching itself how to recognize existing known threats. In addition, because of the packet fragmentation feature factory of framework 10, NetAID 11 is learning its own representation of existing rules and learning to generalize the detection of threats over the space of packet fragments. With little more than a few clicks, Joe has brought NetAID 11 up to speed and surpassed existing intrusion detection systems. Joe has only just begun, however. That afternoon Joe learns of a two new algorithms for sequential packet analysis developed by universities X and Y.

Because of NetAID's extensibility, these new algorithms are easily implemented as NetAID feature factories. Joe activates these new modules and, without any additional work, its outputs are now being used to support existing classifications. Joe notices that the false-positive rate for probing attacks has dramatically decreased. Joe checks each module's link-weight-share and sees that this increase in performance is due to University of X's algorithm. Joe deactivates the University of Y's feature factory module to save processing. After activating five new feature factory modules over the following 4 months, Joe notices that the original rule factory link-weight-share has fallen to zero, indicating that it is no longer being used to support classifications. Joe deactivates the model.

In a seamless fashion, NetAID 11 has learned about existing threats by bootstrapping on existing signature-based rules, learned to generalize this knowledge over packet fragments, evaluated two competing algorithms and implemented one for sequential packet analysis, while demonstrating that such feature extraction is important in solving a probing attack. All this without ever taking the system offline.

It is highly effective to use the false-positives or mistakes produced by the AHaH nodes as negative examples in a technique we call reflection. That is, it is advantageous to let the AHaH node reflect on its mistakes. This enables the AHaH nodes to form a maximal margin or optimal decision surface between true-positives and false-positives. Let us illustrate this procedure.

Presume we are using as input to our classifier words in a document and we are using the presence of a word in the document as a feature. Let us presume that the space of total words is 60,000 and that for each document there are approximately 300 unique words. Let us assign a unique ID to each word: [1,2, ..., 60000]. Each input vector is thus a list of approximately 300 id's. Associated with this vector of labels corresponding to the classes. In our example, our text could be Reuters stories and our labels rough categorizations, for example "earn", "crude", "wheat", "corn" and so on. Although we represent labels as words, we may generally just think of them as unique ID's. Let us create in memory a collection of links, which associate each input feature ID with the labels and specify a weight. For example 563→(0.750) →wheat. Would indicate that feature 563 is linked to label "wheat" with a connection strength of 0.750. Such links are stored in memory, for example, local cache, RAM or hard drive, or even an advanced memristor-based processor. For each training input vector and associated labels, if no such link exists it is created and assigned an initial weight value. For each input feature ID we thus retrieve all links associated with each ID and produce a list, for example:

563→(0.750)→earn.
124→(0.5)→earn.
333→(0.2)→corn.
765→(0.0)→earn.
Etc.

We now total the weights belonging to each label ID. In the example above, we can see that three links are associated with the label "earn" and there total is 0.75+0.5+0=1.25, while one link of magnitude 0.2 is associate with label corn. This output activation is equivalent to y of Text 1. For a real example there would likely be many more features, but for this example let us suppose this was all the links. We may now sort each label by its total activation: Output=[earn(1.25), corn(0.2)].

We may utilize the activation of each label as a direct measure of confidence. Although it is not required, it may be helpful to normalize the output such that the total over all output activations of all output labels is one and thus interpretable as a percentage: Output=[earn(86.2%),corn (13.79%)]. We can see that the system believes the output label is "earn" with 86.2% confidence and corn with 13.79% confidence. Let us presume that the output label is "earn" and not "corn". That is, "corn" is a mistake. Let us call "earn" the true-positive and "corn" the false-positive. Because this is a training episode, we now use the AHaH rule to update the weights for each label. Again, each label is essentially an AHaH node, which was created dynamically though looking up all the links associated with the activated features. Since this is supervised, we are controlling the state of the AHaH node as is illustrated in the following pseudo-code:

```
for (each link connected to label) {
    if (label is a true-postive) {
        weight += - alpha * |y|+beta;
    } else if (label is a false-positive) {
        weight += - alpha * |y|-beta;
    }
}
```

Where we have set γ=0 and omitted the bias weight in this example, for simplicity.

Thus, we may review the procedure as follows:
1. compute activated features
2. compute label (AHaH node) activations from set of activated features.
3. Identify false-positives and true-positives
4. Update each link weight according to the AHaH rule It may be the case that supervised labels do not exist for the data. In this case we may utilize the unsupervised form of the AHaH rule:

```
for (each link connected to label) {
    if (y>0) {
        weight += - alpha * |y|+beta;
    } else if (y<0) {
        weight += - alpha * |y|-beta;
    }
}
```

In this unsupervised case, the AHaH rule is assuming that its output state is correct. By implementing the AHaH rule in an unsupervised manner, it becomes possible for an AHaH node to adapt to new sources of information, a.k.a unsupervised data fusion, and heal from damage. For example, a new set of feature detectors may come online which did not previously exist and which support (are correlated with) its existing classification. For example, let us suppose that and AHaH node had been trained on the label "apple" on a corpus and it has never before seen the word "orange".

Further suppose that it was now presented new documents without supervised labels. Each time a page of corpus (or paragraph, article, or other unit of input) contains the word "orange" (that is, the "orange feature" is active), the output state of the "apple" AHaH node is negative. The AHaH plasticity rule will decrease the value of the weight linking the orange feature detector to the "apple" label until it is negative. On the other hand, if the word "Macintosh" appears frequently when the AHaH node representing the label "apple" is positive, it will acquire a positive weight. In the future, when the word Macintosh is detected there will be a corresponding activation of the "apple" label, even though this was not explicitly taught.

In this manner we can see that in a purely unsupervised manner, AHaH nodes may adapt to new information and make associations so as to retain their state. As we have discussed, an AHaH attractor state represents a point of support vector maximization, which in turn is a reflection of data structure. Based on the example above, it is therefore possible that simply letting a moderately trained AHaH node run in an unsupervised way will result in increasing classification rates and acquisition of new supporting associations.

We may now better understand how the AHaH rule's ability to adapt and learn classifications in both a supervised and unsupervised way will help us construct a generic framework for pattern classification or object recognition. Using an example of a vision detection system, and Illustration 1, let us walk through an example. First, let us presume that the "packet streams" are representative of image data. Let us suppose that a "deep learning" or "autoencoder" network has been constructed which was trained on images from you-tube and has been shown to provide feature outputs selective to faces. Let us capture this code as a feature detector factory "A".

Let us present image data to our system and provide a teach signal to an AHaH node with labels of "human face" and "cat face" and "dog face", etc. Via the method described above, each AHaH node is now trained to output the proper label for the input and is using feature factory A. Let us now suppose that a new algorithm is announced with has been shown to be highly capable of recognizing cat faces. Thus, when a cat face is present, it will active. We may take this algorithm and use it as the basis of a new feature factory "B", which we add to the existing feature factory "A". Without taking our system off line and without providing any training signal, the AHaH nodes that had previously been trained on the "cat face" will start to use the new feature factory "A" output to support its decision on cat faces.

We now see that the classification rate on "cat face" is improving, although it appears to be having trouble with some images. In real-time, a human operator manually provides a supervisory signal, thus enabling the system to recognizing false-positives and adjusts its internal representation. After a few examples, the classification rate on cats improves dramatically. Looking at the total link-weight share to feature factory associated with the cat-face label, we can now see that it has captured more than half of the available link weights associated with the "cat face" label, indicating that this feature detector is very important to the system for recognizing cat faces.

Figure 3:
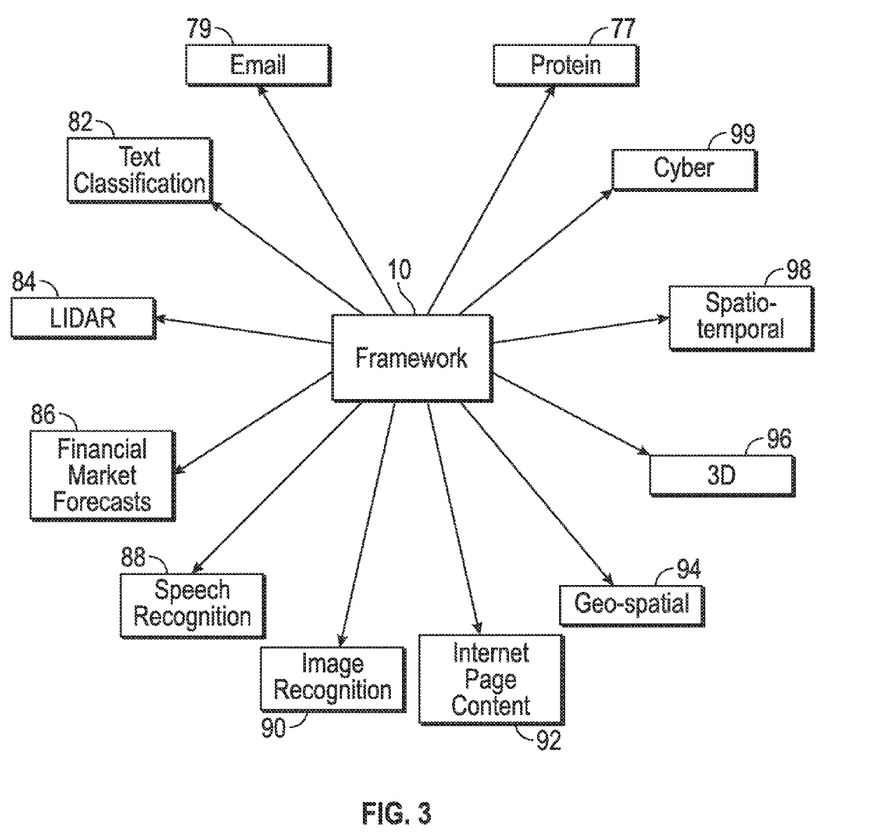
FIG. 3 illustrates a block diagram depicting various applications of framework, in accordance with the disclosed embodiments.

FIG. 3 illustrates a block diagram depicting various applications of framework 10, in accordance with the disclosed embodiments. In such a manner it is easily seen how such an approach (e.g., framework 10) may be used to rapidly integrate existing algorithms, compare algorithms against each other, and adapt in real time to learn new associations in an unsupervised way. Such a system/framework can be employed in many application domains, for example: cyber network intrusion detection 99, speech recognition 88, image recognition 90, internet page content recognition 92, email spam filters 79, financial market forecasting 86, geospatial 94 and spatio-temporal 98 environmental data analysis, text classification 82, protein structure prediction 77, LIDAR 84 and 3D based object classification 96, etc. Indeed, such a system/framework may combine all such capabilities through the use of multiple feature-factories each processing a unique data stream.

Based on the foregoing, it can be appreciated that a number of embodiments are disclosed herein. For example, in one embodiment, an extensible adaptive classification framework can be implemented, which includes, for example, multiple feature detection modules, and a platform for integrating the multiple feature detection modules utilizing a plurality of AHaH nodes as adaptive classifiers over a feature space of multiple and extensible feature factory modules, thereby configuring the platform as an extensible and continuously adaptive pattern recognition platform. In another embodiment, each feature detection module among the multiple feature detection modules can be an algorithm.

In another embodiment, such a platform can be utilized for network intrusion detection. In another embodiment, such a platform can be utilized for speech recognition. In yet another embodiment, such a platform can be utilized for image recognition. In still another embodiment, such a platform can be utilized for Internet page content recognition. In other embodiments, such a platform can be utilized for financial market forecasting. In still other embodiments, such a platform can be utilized for geospatial and spatio-temporal environmental data analysis. In yet other embodiments, such a platform can be utilized for text classification. In another embodiment, such a platform can be utilized for protein structure prediction. In still other embodiments, such a platform can be utilized for LIDAR classification. In yet other embodiments, such a platform can be utilized for 3D based object classification. Finally, in another embodiment, such a platform can be utilized to synthesis or fuse knowledge over all of the above data sources Additionally, in another embodiment, a sum over at least one weight connecting at least one feature factory to at least one AHaH node among the plurality of AHaH nodes can be utilized as measure of at least one feature factory value.

In an alternative embodiment, an extensible adaptive classification framework can include, for example, multiple and extensible feature factory modules; and a plurality of AHaH nodes operating as adaptive classifiers over the space of said multiple an extensible feature factory modules, wherein said multiple and extensible feature factor modules and said plurality of AHaH nodes together provide an extensible and continuously adaptive pattern recognition platform.

In another embodiment, each feature factory module among said multiple and extensible feature factory modules can comprise an algorithm. In yet another embodiment, each feature factory module among said multiple and extensible factor modules can employ one or more weights therebetween and one or more AHaH nodes among said plurality of AHaH nodes as a signal for self-optimization.

In another embodiment, mistakes with respect to said platform can be employed as false-positive training examples. Such a platform can be configured, for example, for network intrusion detection, speech recognition, image recognition, Internet page content recognition, financial market forecasting, geospatial and spatio-temporal environmental data analysis, text classification, protein structure prediction, LIDAR classification, 3D based object classification, and so forth.

In some embodiments, a sum over at least one weight connecting at least one feature factory to at least one AHaH node among said plurality of AHaH nodes can be utilized as a measure of at least one feature factory value with respect to at least one multiple and extensible feature factory module among said multiple and extensible feature factory modules.

In yet another embodiment, an extensible adaptive classification framework, can include, for example, multiple and extensible feature factory modules; and a plurality of AHaH nodes operating as adaptive classifiers over a space of said multiple an extensible feature factory modules, wherein said multiple and extensible feature factor modules and said plurality of AHaH nodes together provide an extensible and continuously adaptive pattern recognition platform, wherein each feature factory module among said multiple and extensible factor modules employs at least one weight therebetween and at least one AHaH node among said plurality of AHaH nodes as a signal for self-optimization.

In yet another embodiment, an extensible adaptive classification method, can be implemented, which includes the steps or logical operations of configuring a multiple and extensible feature factory modules; and providing a plurality of AHaH nodes that operate as adaptive classifiers over a space of said multiple an extensible feature factory modules, wherein said multiple and extensible feature factor modules and said plurality of AHaH nodes together provide an extensible and continuously adaptive pattern recognition platform.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. An extensible adaptive classification framework, comprising:
   a plurality of extensible feature factory modules comprising at least one of both hardware and software, wherein at least one extensible factory module among said plurality of extensible factory modules receives network packet data;
   a plurality of AHaH (Anti-Hebbian and Hebbian) nodes operating as adaptive classifiers over a space of said plurality of extensible feature factory modules, wherein said plurality of extensible feature factory modules and said plurality of AHaH nodes together provide an extensible and continuously adaptive pattern recognition platform with respect to said network packet data which computes feature activations among said plurality of extensible factory modules and at least one AHaH node activation from said activated features to identify false-positives and true positives and update link weights according to an AHaH rule through said plurality of AHaH nodes.

2. The framework of claim 1 wherein said at least one extensible feature factory module among said plurality of extensible feature factory modules comprises an algorithm and wherein each AHaH node among said plurality of AHaH nodes operates said AHaH rule expressed by the following equation:

$$\Delta w_i = x_i f(y) - \delta w_i$$

$$\Delta w_{bias} = -Yy$$

$$y = \sum_{i=0}^{N} x_i w_i + w_{bias}$$

$$f(y) = -\alpha y + \beta \text{sign}(y).$$

3. The framework of claim 1 wherein said at least one extensible feature factory module among plurality of said extensible feature factory modules employs at least one weight therebetween and at least one AHaH node among said plurality of AHaH nodes as a signal for self-optimization.

4. The framework of claim 1 wherein said at least one extensible feature factory module comprises a module that converts existing packet signatures associated with said network packet data into said feature activations.

5. The framework of claim 1 wherein said network packet data comprises a packet stream.

6. The framework of claim 2 wherein false-positives produced by said plurality of AHaH nodes as negative examples in a technique comprising reflection to form a maximal margin or an optimal decision surface between true-positives and false-positives.

7. The framework of claim 2 wherein said platform is configured for network intrusion detection.

8. The framework of claim 2 wherein said platform is configured for speech recognition.

9. The framework of claim 2 wherein said platform is configured for image recognition.

10. The framework of claim 2 wherein said platform is configured for Internet page content recognition.

11. The framework of claim 2 wherein said platform is configured for financial market forecasting.

12. The framework of claim 2 wherein said platform is configured for geospatial and spatio-temporal environmental data analysis.

13. The framework of claim 2 wherein said platform is configured for text classification.

14. The framework of claim 2 wherein said platform is configured for protein structure prediction.

15. The framework of claim 2 wherein said platform is configured for LIDAR classification.

16. The framework of claim 2 wherein said platform is configured for 3D based object classification.

17. The framework of claim 2 wherein said plurality of extensible feature factory modules and said plurality of AHaH nodes comprise said extensible and continuously adaptive pattern recognition platform as classification engine that continuously adapts and integrates feature factories over time without having to take an associated system offline or retrain said associated system.

18. The framework of claim 6 wherein said plurality of extensible feature factory modules and said plurality of AHaH nodes comprise said extensible and continuously adaptive pattern recognition platform as classification engine that continuously adapts and integrates feature factories over time without having to take an associated system offline or retrain said associated system.

19. The framework of claim 3, wherein a sum over at least one weight connecting at least one extensible feature factory module among said plurality of extensible feature factory modules to at least one AHaH node among said plurality of AHaH nodes is utilized as a measure of at least one feature factory value with respect to at least one extensible feature factory module among said plurality of feature factory modules.

20. The framework of claim 3 wherein said plurality of extensible feature factory modules and said plurality of AHaH nodes comprise said extensible and continuously adaptive pattern recognition platform as classification engine that continuously adapts and integrates feature factories over time without having to take an associated system offline or retrain said associated system.

\* \* \* \* \*